July 6, 1937.  A. N. SPANEL  2,086,481
FORM FOR MAKING LATEX GARMENTS AND THE LIKE
Filed Aug. 6, 1934  5 Sheets-Sheet 1
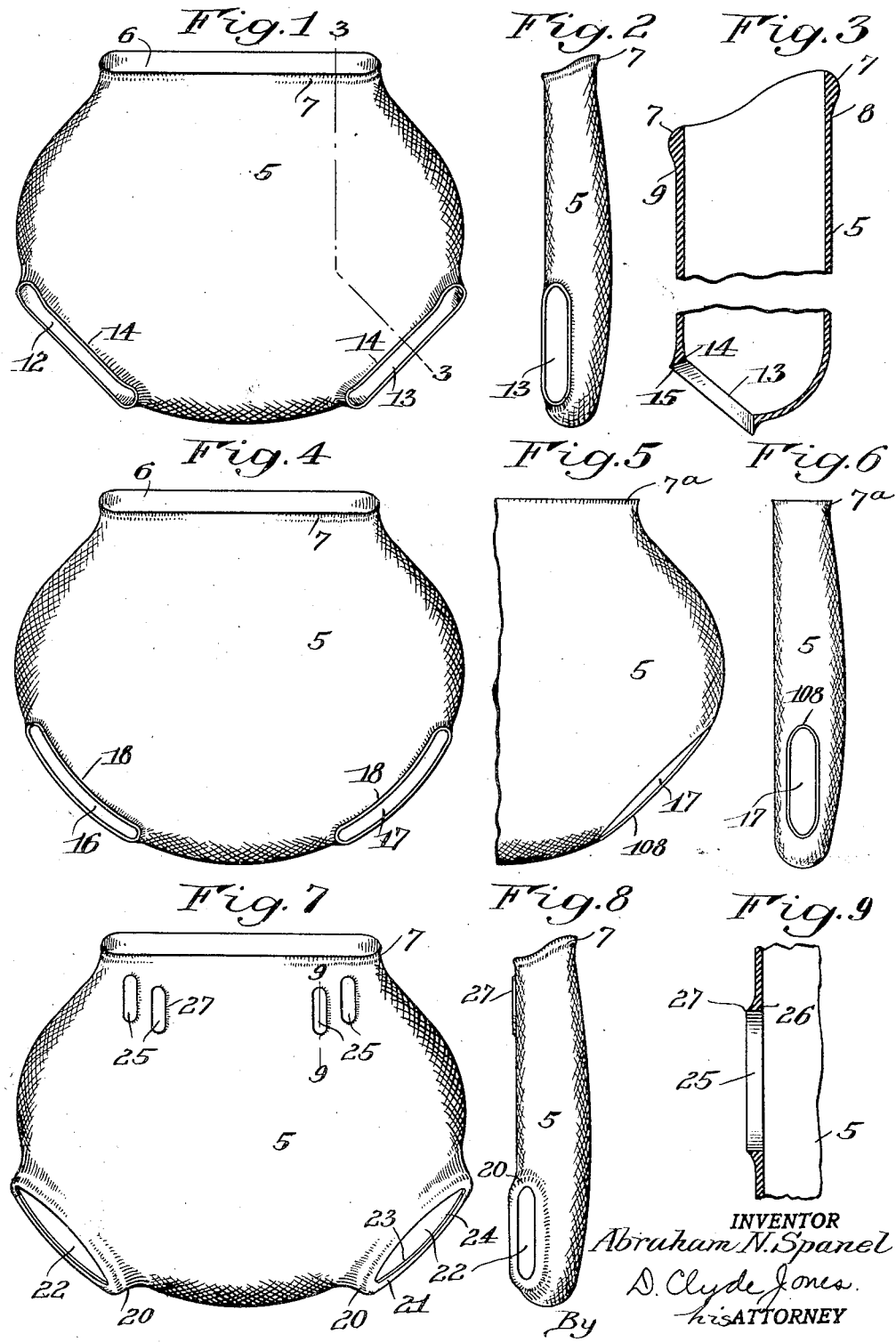

July 6, 1937.  A. N. SPANEL  2,086,481
FORM FOR MAKING LATEX GARMENTS AND THE LIKE
Filed Aug. 6, 1934   5 Sheets-Sheet 2
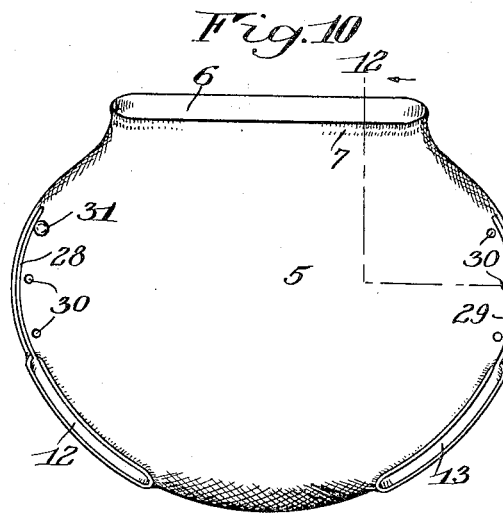
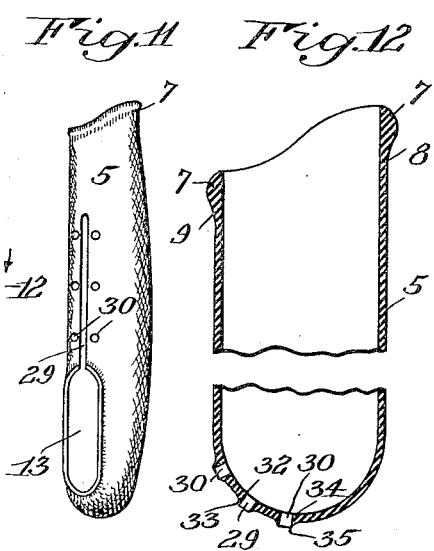
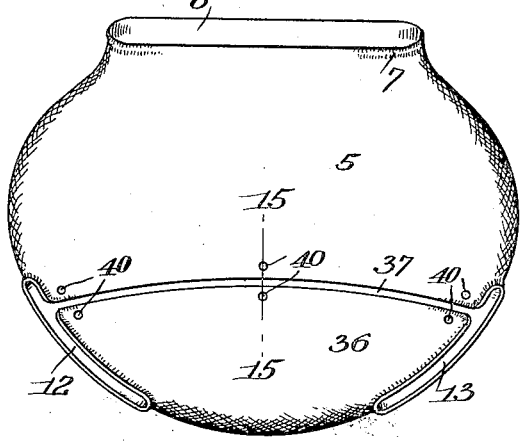
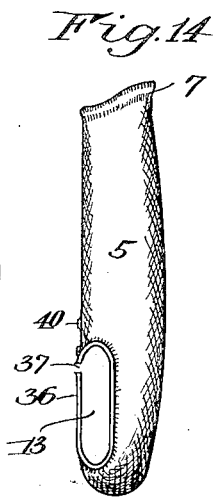
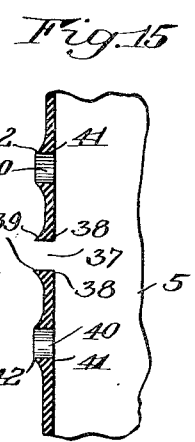
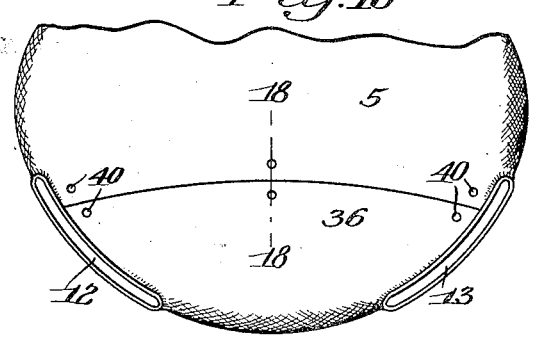
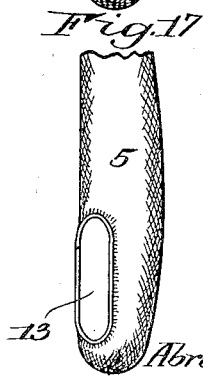
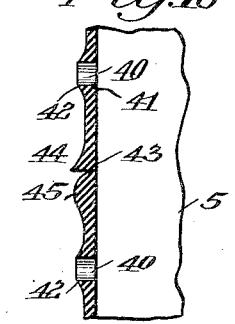
INVENTOR
Abraham N. Spanel
BY D. Clyde Jones
his ATTORNEY

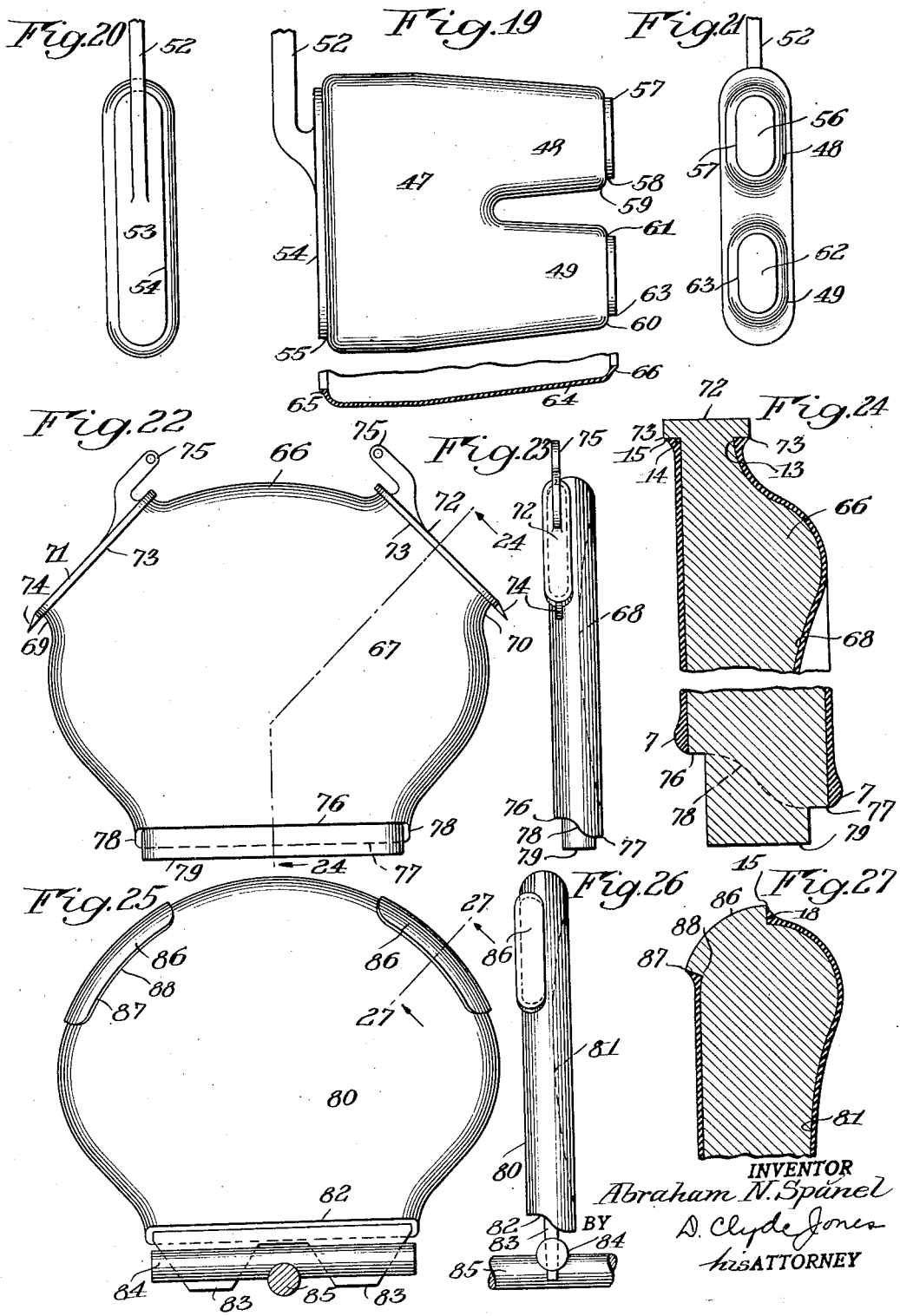

July 6, 1937.     A. N. SPANEL     2,086,481
FORM FOR MAKING LATEX GARMENTS AND THE LIKE
Filed Aug. 6, 1934     5 Sheets-Sheet 4
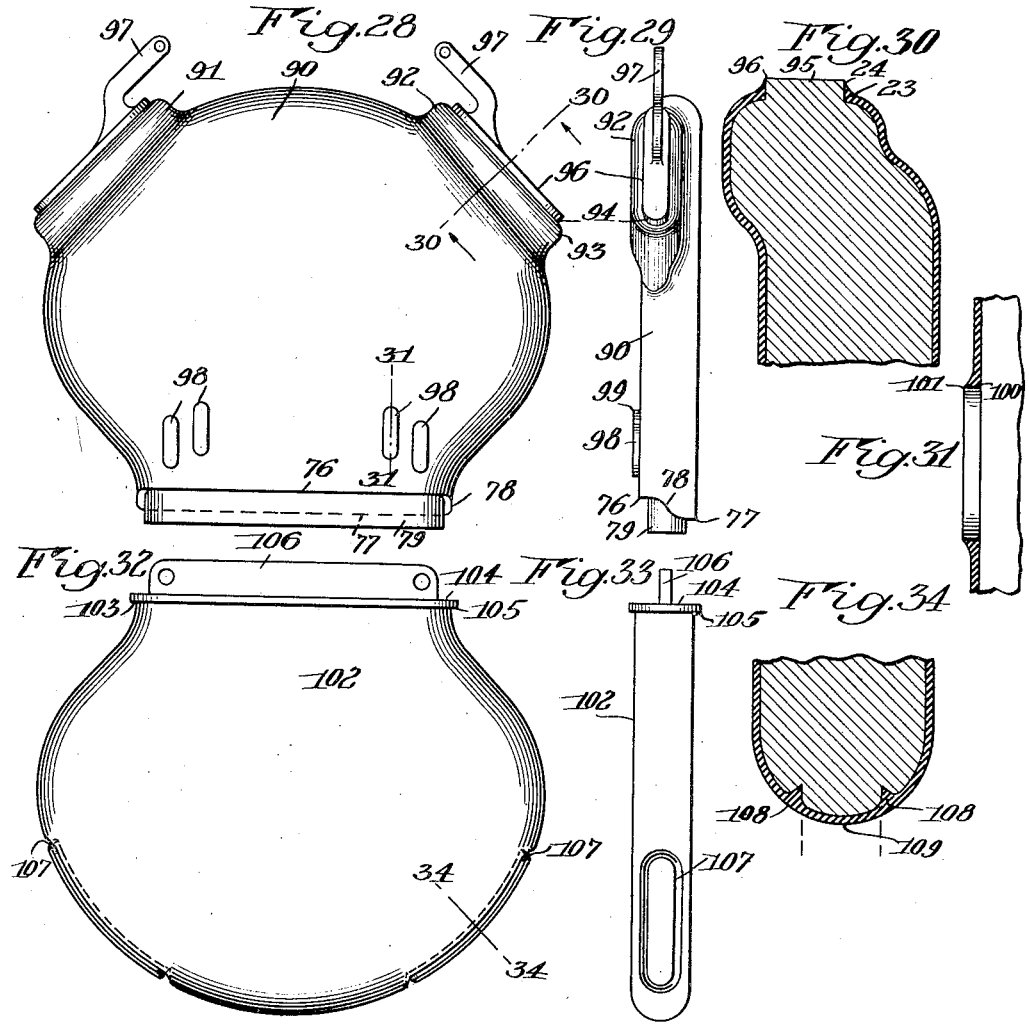
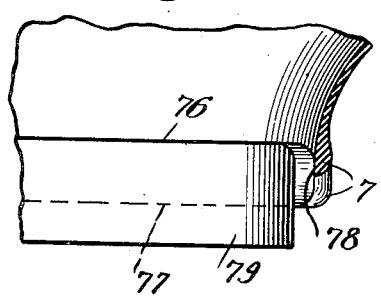
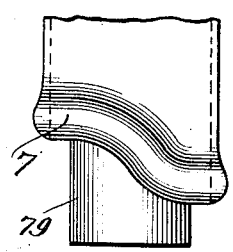
INVENTOR
Abraham N. Spanel
BY D. Clyde Jones
his ATTORNEY July 6, 1937.  A. N. SPANEL  2,086,481
FORM FOR MAKING LATEX GARMENTS AND THE LIKE
Filed Aug. 6, 1934   5 Sheets-Sheet 5
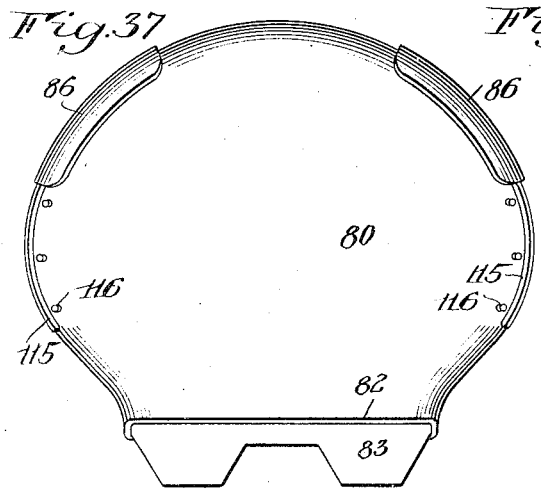
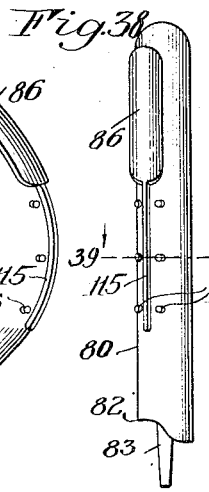
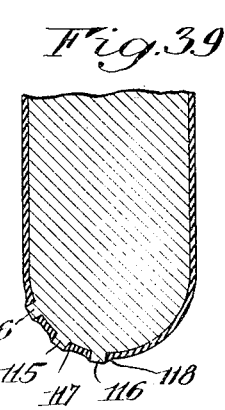
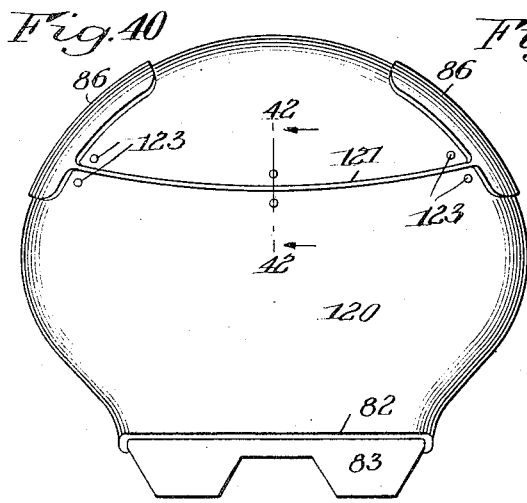
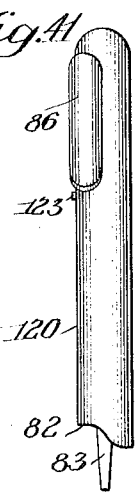
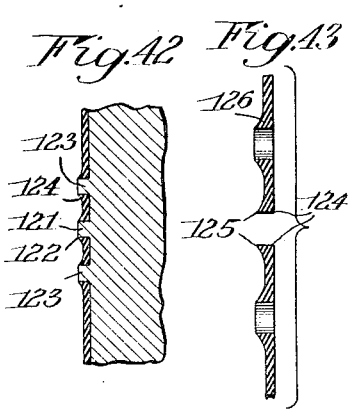
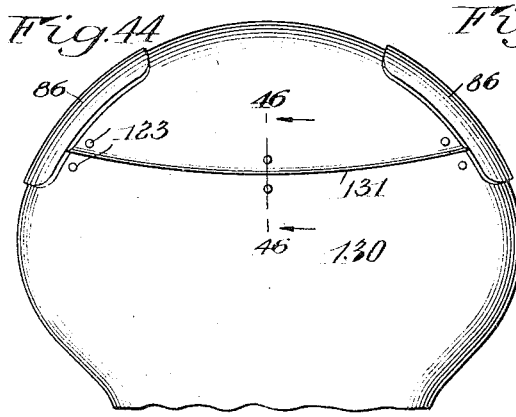
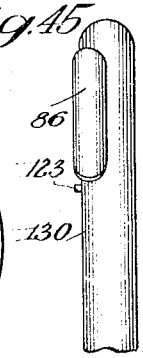
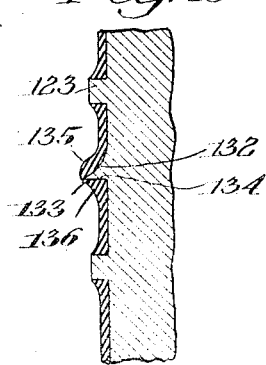
INVENTOR
Abraham N. Spanel
BY D. Clyde Jones
his ATTORNEY Patented July 6, 1937

2,086,481

UNITED STATES PATENT OFFICE 2,086,481

FORM FOR MAKING LATEX GARMENTS AND THE LIKE

Abraham N. Spanel, Rochester, N. Y.

Application August 6, 1934, Serial No. 738,669

12 Claims. (Cl. 18—41)

This invention relates to rubber garments and to forms for making the same.

This application is a continuation in part of the application of Abraham N. Spanel, Serial No. 696,037, filed October 31, 1933, now issued as Patent #2,015,632.

Present commercial rubber garments such as baby pants, are bulky, inconvenient to apply and of relatively short life. Such baby pants are commonly made either by sewing together pieces of rubberized fabric or else they are made by a cementing process, after which reinforcing borders are attached at the margins of the openings therein. Where a rubberized fabric is employed, the garment has practically no elasticity and where the garment is made of sheet rubber it either has such limited elasticity that it is difficult to apply to the wearer, or else it is so weak that it tears easily, especially at the openings and along the seams.

In accordance with the main feature of the present invention, a rubber garment, such as baby pants, is made of dipped latex of high elasticity and long life, which garment is made of one piece and without seams, even the reinforcing margins or borders of the openings being made integral with the garment so that it is composed of one homogeneous mass of latex.

Another feature of the invention relates to a latex garment in which the top opening is reinforced by a ridge or border of one character and the margins of the leg openings therein are reinforced by a border or edge of another character.

A further feature of the invention relates to a latex garment provided with a margin at its top opening, reinforced by a ridge having its cross section semi-pear-shaped, and provided with margins at the leg openings reinforced by angular ridges, which terminate in feather or torn edges.

Still another feature of the invention relates to a latex garment in which the margins of the leg openings have a cut edge and are reinforced by an integral ridge of rubber.

An additional feature of the invention relates to a latex garment in which the front and back top portions thereof are of unequal lengths, the edges of the margin of said portions being reinforced by a thickened reinforcement of the material thereat.

A further feature of the invention relates to a latex garment provided with front and back portions which project to unequal distances and which have thickened integral reinforcements at their margin, the reinforcements being connected together at their ends by other reinforcements defining ogee curves.

An additional feature of the invention relates to improved forms on which seamless latex garments having top openings and leg openings therein may be easily made and provided with integral reinforced margins for the openings, all of which is accomplished at a minimum cost, while still providing a garment of superior quality.

These and other features of the invention will appear from the detailed description and claims when taken with the drawings in which Fig. 1 is a front view of a latex garment having abbreviated legs and made in accordance with the present invention; Fig. 2 is a side elevation thereof, and Fig. 3 is an enlarged fragmentary sectional view of the same taken substantially on the line 3—3 of Fig. 1; Fig. 4 is a modified garment without abbreviated legs; Fig. 5 is a fragmentary view of another modified garment and Fig. 6 is a side elevation of the same; Fig. 7 is a front view of still a different modified garment which is provided with abbreviated legs; Fig. 8 is a side elevation of this garment; Fig. 9 is a section thereof taken substantially on the line 9—9 of Fig. 7 showing the type of reinforcement for the ventilating and decorating openings in the front of the garment; Figs. 10 and 11 are respectively a front view and a side view of a modified type of garment in which the sides are provided with slits extending into the leg openings, which slits may be closed by buttons or other suitable fastening means after the garment has been applied to the wearer; Fig. 12 is a sectional view through this garment taken on the line 12—12 of Fig. 10; Figs. 13 and 14 are respectively a front view and a side view of a still different type of garment which is provided with a front flap adapted to be buttoned or fastened to the main portion of the garment; Fig. 15 is a sectional view of this garment taken substantially on the line 15—15 of Fig. 13; Figs. 16 and 17 are respectively a fragmentary front view and a fragmentary side view of still a different type of garment with a front flap, the edges of the garment at this flap being strengthened by a reinforcement of a different character; Fig. 18 is a fragmentary sectional view of the same taken substantially on the line 18—18 of Fig. 16 showing the reinforcement at the front flap; Fig. 19 is a front view of a form on which a latex garment such as latex drawers can be made, and also shows slightly displaced therefrom the fragmentary section of the garment formed thereon; Figs. 20 and 21 are respectively left hand and right hand end views of the form shown in Fig. 19; Fig. 22 is a front elevation and Fig. 23 is a side elevation of a modified type of form; while Fig. 24 is a cross sectional view of this form taken substantially on the line 24—24 of Fig. 22 and illustrating a fragment of the garment on the form; Fig. 25 is a front elevation and Fig. 26 is a side elevation of a form for making a latex garment without legs; and Fig. 27 is a section of this last-mentioned form taken substantially on the line 27—27 of Fig. 25 also showing a fragment of the deposited garment still on the form; Fig. 28 is a front elevation and Fig. 29 is a side elevation of a form for making the garment with abbreviated legs; Fig. 30 is a section of this last-mentioned form taken substantially on the line 30—30 of Fig. 28 and also showing a fragment of the garment as it is deposited on the form and before it has been stripped therefrom; Fig. 31 is a section of the garment through one of the ventilating and decorating openings therein, which fragment of the garment is taken through that portion thereof which was deposited adjacent the line 31—31 of Fig. 28; Fig. 32 is a front elevation; and Fig. 33 is a side elevation of a form on which a rubber garment can be made, having the leg openings indicated by reinforcing ridges, which openings must be made in the garment after it is removed from the form, by cutting, stamping or clicking out the portion of the layer within the reinforcing rings; Fig. 34 is a section taken on the line 34—34 of Fig. 32 and showing a portion of the garment on the form; Figs. 35 and 36 are fragments of those portions of the form shown in Figs. 22 to 29 inclusive on which the top portion of the garment with its reinforced opening is made, Fig. 35 being a front elevation with a portion of the garment layer broken away and Fig. 36 being a side elevation showing the garment with the reinforcement for the top opening; Figs. 37 and 38 are respectively a front elevation and a side elevation of a form on which the garment of Figs. 10 and 11 can be made; Fig. 39 is a fragmentary sectional view taken on the line 39—39 of Fig. 38 showing a portion of the garment still on the form and indicating the character of the reinforcement at the openings and the slit in the garment; Figs. 40 and 41 are respectively a front elevation and a side elevation of a form on which the garment in Figs. 13 and 14 can be made; Fig. 42 is a fragmentary section on the line 42—42 of Fig. 40 and illustrating a portion of the garment on the form; Fig. 43 is an enlarged fragmentary section of the garment after it has been stripped from the form showing the character of reinforcement for the fastening openings and for the edges of the slit defining the flap; Figs. 44 and 45 are respectively a fragmentary front elevation and a fragmentary side elevation of a form on which the garment in Figs. 16 and 17 can be made; Fig. 46 is a fragmentary section taken on the line 46—46 of Fig. 4 showing the contour of that portion of the form defining the button fastening openings and the slit defining the flap as well as the reinforcement of the last-mentioned portions of the garment.

Referring especially to Figs. 1, 2, and 3, 5 designates a garment made of one piece of seamless latex. The garment has a top opening 6, the margin 7 of which as best indicated in Fig. 3 is formed of an integral thickened mass of the latex having substantially the cross section of one-half the cross section of a tear drop. It will be noted that the top portion of the back 8 of the garment extends beyond the top portion of the front 9 thereof, although it will be understood that if so desired, the front 9 may extend beyond the back 8. By reason of having the front and back portions of unequal length, these portions may be easily separated for applying the garment to the wearer and in addition they give the garment an attractive appearance, also giving more fabric to the back where it is needed most. The lower portion of this garment as illustrated, is provided with abbreviated legs having leg openings 12 and 13 therein, which face toward the front of the garment. It will be noted that the margin of the garment at each leg opening is reinforced, as indicated at 14 in Fig. 3, by an accumulation or ridge of latex, integral with the latex of the garment, which edge terminates in a torn or feather edge 15. The exact shape of the legs and the reinforcement for the leg openings therein will be better appreciated by reference to the upper portion of Fig. 24.

The modified form of garment shown in Fig. 4 is similar to that already described and identical parts thereof are identified by the same reference characters as previously employed in connection with Figs. 1, 2, and 3. This modified garment has no abbreviated leg portions, but instead the leg openings 16 and 17 are provided in the main portion of the garment. These leg openings face toward the front of the garment and have reinforced margins 18 similar to those reinforcements, shown at 14 (Fig. 3), which terminate in torn or feather edges similar to that illustrated at 15 also shown in Fig. 3. The exact character of the reinforcement for the margin of the leg openings in this garment, may best be understood by reference to the upper portion of Fig. 27.

The modified garment 5 shown in Figs. 5 and 6 is similar to that just described except that the reinforcement 7a for the margin of the top opening therein, is of the type indicated at 14 on Fig. 3. The leg openings such as 17 in the garment, have margins reinforced by ridges 108 provided with cut edges.

The modified garment shown in Figs. 7, 8, and 9 is similar to the garments already described and identical parts thereof are identified by the same reference characters as were used in describing the foregoing figures. However, this garment has pronounced legs 20 and these legs are provided with a rim 21 surrounding the openings 22 in the leg. The material at the margins of these openings is strengthened by an angular reinforcement 23 which terminates in a torn or feather edge 24 as will be best understood by reference to Fig. 30. The front of the garment near its top is provided with pairs of elongated openings 25 which serve not only to ventilate the garment but are also adapted to receive ribbons or other decorative materials to improve the appearance of the garment. The material at the margin of each of these openings is strengthened by an angular accumulation 26 of the material of the garment and this reinforcement terminates in a feather edge 27 (Fig. 9).

The modified garment shown in Figs. 10, 11, and 12 is similar to that illustrated in Figs. 1, 2, and 3, but differs therefrom in that the leg openings 12 and 13 are enlarged by slits 28 and 29 communicating with the leg openings. These slits serve to enlarge the leg openings in order to facilitate applying the garment to the wearer, but after the garment has been applied, suitable fastening means such as buttons 31 inserted in each pair of leg openings, function to close the slit. Not only the margins of the leg openings 12 and 13, but also the margins of the material at these slits 29 and 30 are reinforced by an angular accumulation 32 of the material of the garment, which accumulation terminates in a torn or feather edge 33. Each of the buttonholes 30 has its margin likewise reinforced by an angular accumulation 34 also terminating in a feather edge 35.

The modified garment shown in Figs. 13, 14, and 15 differs from the foregoing garments in that a front flap 36 is provided therefor, so that if the garment is worn by a baby, the diapers may be removed without removing the garment, merely by opening this flap. The flap 36 is defined by a slit 37 in the material at the front of the garment, which slit communicates with the leg openings 12 and 13, which are reinforced in a manner already described. The margins of the material at the slit are reinforced as indicated in Fig. 15 by angular accumulations 38 of the material of the garment, which accumulations terminate in torn or feather edges 39. It will be noted that the garment is provided with pairs of buttonholes 40 to receive buttons or other fastening means for holding the flap closed, one opening of each pair being in the front of the garment and the other opening being in the flap thereof. The margins of these openings 40 are likewise strengthened by an angular accumulation 41 of the material of the garment which accumulation terminates in a torn or feather edge 42.

The modified garment shown in Figs. 16, 17, and 18 differs from the garment last described, in that the reinforced margins on the flap and on the adjacent portion of the garment front are of different character, as illustrated in Fig. 18. In this last-mentioned figure, it will be noted that the edge of the front of the garment is reinforced by an angular accumulation 43 terminating in a torn or feather edge 44, whereas, the adjacent edge of the flap is reinforced by an accumulation 45, which accumulation in cross section is substantially semi-pear-shaped or semi-oval. It will be appreciated that during the manufacture of the garment the accumulations 43 and 44 are connected together and in order to separate them the material is torn thereat as will best appear from the description of the form and the method of making the garment thereon as will be hereinafter set forth.

A garment similar to those already described, except that it is provided with pronounced legs, can be made on the form shown in Figs. 19, 20, and 21. This form includes a body portion 47 and leg portions 48 and 49 and is adapted to be dipped vertically into a latex bath, being suspended by a support 52 projecting from the left end of the form as shown in Fig. 19. This left end comprises a panel or boss 53 of smaller contour than the body portion 47 of the form, which panel has an abrupt edge 54 and extends abruptly from its junction 55 of the body of the form. It will be noted in Fig. 19 that the body portion merges by a curve to this junction. The free end of the leg portion 48 of the form likewise terminates in a raised panel or boss 56 having an abrupt edge 57, said panel rising abruptly from its junction 58 with the leg portion. This leg portion also merges with the junction 58 by a curve illustrated at 59. Similarly, the leg portion 49 merges by a curve 60 with the juncture 61 between the leg portion and a panel or boss 62 rising abruptly from this junction. This panel is also provided with an abrupt edge 63.

In making of pants on this form, the form is dipped vertically by the support 52 one or more times into a bath of latex or an aqueous dispersion of rubber, wherein the form is completely submerged and after each of the dippings the layer of latex deposited on the form is permitted to dry in accordance with the usual practice. In the course of the several dippings, the latex will tend to accumulate by surface tension in the junctions 55, 58 and 61 of the form, while it will tend to flow away from the abrupt edge 54, 57 and 63 to define lines of weakness in the deposited layer. When a layer of the desired thickness has been deposited on the form, this layer is permitted to dry and cure until it can be properly manipulated, then the portions of the layer over the panels 53, 56 and 62 can be parted by tearing from the remainder of the layer, due to the mentioned lines of weakness defined therein during the dipping operations. However, the accumulations of rubber at the junctions 55, 58 and 61 will provide reinforcements for the margins of the layer at the openings formed by the removal of the portions of the layer over the mentioned panels. When the remainder of the deposited layer on the form has been properly dried and cured, it can be stripped from the form by moving toward the right as shown in Fig. 19. In this figure, there is indicated a fragment of the latex pants made in the manner just described, wherein it will be noted that the main portion 64 is relatively thin, whereas, a thick reinforcing edge 65 is provided for the openings in the body portion and a reinforcement such as 66 is provided at the opening in each leg.

The garment illustrated in Figs. 1, 2, and 3 can be made by dipping the form of the character shown in Figs. 22, 23, and 24, into a latex bath, such as an aqueous dispersion of rubber. This form which has the general shape of the garment to be made thereon, is provided with a flat front surface 67 and a dished or concave rear surface 68 so that the rear side of the resulting garment will be formed large enough to accommodate itself to the body of the wearer. The form is also provided with a pair of diverging leg portions 69 and 70, and each leg portion terminates in a flattened elliptical boss or plate such as 71 and 72. The junction of the leg portion with the plate is abrupt, resulting from the intersection of two surfaces. As herein shown these surfaces intersect at substantially a right angle, although this angular relation may be deviated from within relatively wide limits. The edges of the plates 71 and 72 as best indicated at Fig. 24 terminate in an abrupt edge 73 so that the liquid latex will tend to flow away therefrom leaving a weakened area in the resulting deposited layer. In order to control the flow of liquid latex from the faces of the plates 71 and 72, the drip points 74 are provided. The supports 75 for suspending the form during dipping, extend upwardly from the faces of the plates 71 and 72 and project to a distance above the form so that the ends of these supports are never completely submerged in the latex bath during the dipping operations. By this arrangement the excess latex layer at the faces of the plates 71 and 72 is easily grasped by an operator so that the removal of this excess portion of the deposited layer can easily be effected. The lower portion of the form terminates in a continuous abrupt edge to define the opening in the upper part of the garment as best shown in the fragmentary views of Figs. 35 and 36 which illustrate portions of the edge defining the front of the garment, as indicated at 76, is in a higher horizontal plane than the edge portion 77 defining the back edge of the garment. It will be noted that the edge portions 76 and 77 are connected at each end by an abrupt edge 78 having the general outline defined by an ogee curve. The lower part of this form has a projection 79 to facilitate the stripping away of an excess portion of the deposited latex layer.

In making the latex garment on this form, the form with the exceptions of the ends of the supports 75 is completely submerged a plurality of times into a bath of liquid latex which is an aqueous dispersion of rubber, with a suitable drying interval between each of the dippings. This dipping is repeated, followed by a drying interval until a layer of the desired thickness is deposited on the form. The portion of the resulting layer on the projection 79 of the form is stripped or torn away as far as the abrupt edge of the lower part of the form herein designated by the characters 76, 77 and 78 (see Figs. 35 and 36). It will be understood that in the course of the several dippings of the form, that the layer has accumulated, as shown in the lower part of Fig. 24 to provide the reinforcement 7, the excess portions of the deposited layer on the face and sides of the plates 71 and 72 are removed by stripping or tearing at the abrupt edge 73. It will also be understood that in the course of the dipping operations, the liquid latex will accumulate in the junction between the upper portion of the form and the plates 71 and 72 so that there will be provided a reinforcement such as 14 at the leg opening which reinforcement terminates in a torn or feather edge 13. The garment can now be removed from the form by withdrawing the form through the top opening in the garment. The remaining steps of preparing the garment for market are well-known and need not be herein set forth.

The garment illustrated in Fig. 4 can be made on the type of form 80 shown in Figs. 25, 26, and 27. This form is generally circular in shape with its front surface substantially flat and its rear surface 81 dished or concave. The lower portion of the form is provided with an abrupt edge 82 identical with that shown at 76, 77 and 78 of the foregoing figures and two fins 83 project from the bottom of the form to serve as a support therefor. These fins detachably engage openings 84 in a suitable rack 85 such as is employed in dipping a plurality of forms into a liquid latex bath. The upper portion of the form is provided with two flattened elliptical plates or bosses 86 having generally a curved exposed surface terminating in an abrupt edge 87 adjacent the junction of the plate with the body of the form. This junction as best shown at 88 of Fig. 27 is formed by the intersection of two surfaces intersecting at approximately a right angle.

In making the garment on this form a plurality of forms supported on the rack 85 are submerged in a liquid latex bath a plurality of times with a drying interval between each dipping until a deposited layer of the desired thickness has been deposited. Thereafter, the portion of the layer on the faces of the plates 86 is removed as far as the abrupt edge 87. It will be understood that in the course of the dipping operations, the liquid latex will accumulate in the junction 88 as indicated at 18 in Fig. 27. When the layer is stripped away from the face of the plates 86, a torn or feather edge 15 will remain on the reinforcement 18. The excess portion of the layer on the fins and lower end of the form is torn away as far as the abrupt edge 82. In this instance also, the liquid latex will accumulate as shown at 7 in Fig. 24 adjacent the abrupt edge 82, so that the resulting top edge in the garment will have a reinforced margin.

The garment illustrated in Figs. 7, 8, and 9 can be made on the form 90 illustrated in Figs. 28, 29, and 30. This form is flat and has generally a circular outline, except at its bottom portion which is identical with the bottom portion of the form shown in Figs. 22, 23, and 24. Leg portions 91 and 92 project from the form and are offset laterally from the principal plane of the form. These leg portions have the outline of a flattened ellipse and curve as indicated at 93 to a junction 94 with a projecting panel 95 which is defined by an abrupt edge 96. From each of these panels there extends upwardly, supports 97 by which the form can be suspended during the dipping operations. It will be noted that these supports project a substantial distance above the main body of the form so that even when the form is submerged in a bath of liquid latex, a portion of the supports will remain exposed to facilitate the stripping away of the excess portions of the layer deposited on the form. On the front of the form near the bottom thereof there are provided pairs of bosses 98 of generally flattened elliptical outline. These bosses project abruptly from the front face of the form and terminate in an abrupt edge 99 as best shown in Fig. 29. The lower portion of the form will not be described since it is identical with the construction of the lower portion of the form of Fig. 22.

In making a garment on this form, the form is dipped a plurality of times, with a drying interval intervening, into a bath of liquid latex until a layer of the desired thickness is deposited on the form. It will be understood that in the junctions 94 of the panels 95 with the leg portions 91 and 92, the liquid latex will accumulate as indicated at 23 in Fig. 30, while at the abrupt edge 96 of the panels, the liquid latex will tend to flow away so that there will be a weakened outline in the deposited layer defined by the abrupt edge. The liquid latex will be deposited on the lower portion of the form as best indicated at 7 in Fig. 24. With the layer thus deposited on the form, and suitably dried and cured, the excess portions of the deposited layer on the panels are stripped away as far as the abrupt edge 96 of the panel, leaving a torn or feather edge 24 for the reinforcement 23 at the leg openings. The excess portion of the layer on lower part 79 of the form is stripped away as far as the abrupt edges 76, 77 and 78. It will be understood that during the dipping operations, the liquid latex will accumulate in the junctions of the bosses 98 with the form as indicated at 100 in Fig. 31. The portions of the deposited layer on the faces of the bosses 98 are torn away as far as the abrupt edges 99 thereof, thereby leaving a feather or torn edge 101 for the reinforcements 100 of the ventilating openings in the garment. The garment can then be removed from the form by withdrawing the form through the top opening in the garment. The remaining operations for preparing the garment for market, need not be here repeated.

In certain instances, it may be desirable to make a garment of the style illustrated in Figs. 5 and 6. In this garment the outlines of the leg openings are merely indicated by a reinforced ridge 108 formed during the operations of depositing the garment on the form, and after the garment is deposited on the form, preferably after it is removed from the form, the portion of the rubber layer within the reinforcing rings can be cut, clicked or otherwise stamped out. A garment of this type can be made on the form 102 shown in Figs. 32, 33, and 34. With this type of form, the top of the garment is deposited in its uppermost position. This form is flat and of generally circular outline. The upper portion of the form is connected through an abrupt junction 103 with a flat panel 104 having an abrupt edge 105. Each panel 104 is provided with an upwardly extending support 106 by which the form can be suspended during the dipping operations. In the edges of the form there are provided in a position where it is desired to define the leg openings, a pair of recesses 107 which define leg openings. These recesses are generally of flattened elliptical outline.

In making the garment on this form, the form is dipped a plurality of times, with a drying interval intervening, into a bath of liquid latex until the garment of the desired thickness is deposited on the form. In the course of this dipping operation, the liquid latex will accumulate in the junction 103 of the panel 104 of the form, but the deposited layer will have a line of weakness therein defined by the abrupt edge 105 so that the excess rubber on the face of the panel can be stripped or torn away as far as this abrupt edge 105. In the course of the dipping operation, the liquid latex will accumulate in the recesses 107 to provide a leg opening reinforcement 108 as shown in Fig. 34. In completing the garment it is necessary to remove a portion of the layer 109 within the reinforcement 108, that is, the portion of the layer between the dotted lines as shown in this last-mentioned figure.

The type of garment shown in Figs. 10, 11, and 12 can be made on the form shown in Figs. 37, 38, and 39. This form is identical with that shown in Figs. 25, 26, and 27 but differs therefrom in that a fin 115 connected with each boss 86 extends along the edge of the form toward the portion thereof which generates the top opening in the resulting garment. Pairs of button-hole defining bosses 116 are provided adjacent each fin, the fin separating the bosses of a pair. As herein shown three pairs of bosses 116 are provided adjacent each fin 115, however, this number may be increased or diminished without departing from the invention.

In making a garment on this form, the same operations are followed as were set forth in describing the manufacture of a garment on the form of Fig. 25. However, it will be understood that at each side of the fin 115, an angular accumulation 117 of the latex will take place to provide a reinforcement for the margin of the resulting slit in the garment defined by the fin 115. These reinforcements 117 having a feather or torn edge due to the fact that a portion of the layer on the exposed face of the fin 115, is stripped or torn away in the course of manufacturing the garment. Likewise, the portions of the layer at the faces of the bosses 116 will be stripped away leaving circular openings which are reinforced by accumulations 118 of the latex at the junction of the bosses 116 with the main portion of the form. The remaining operations of making the garment on the form will be obvious from the foregoing description.

The type of garment shown in Figs. 13, 14, and 15 can best be made on the form 120 shown in Figs. 40, 41, and 42. This form is identical with the form shown in Figs. 25, 26, and 27, except that the leg opening bosses 86 are connected by a fin 121 which serves to define a flap in the resulting garment. The fin 121 as best shown in Fig. 42 rises abruptly from the face of the form to define a junction in which the liquid latex can accumulate. The two exposed edges 122 of this fin however, are sharp or abrupt to define an edge of the flap and the garment. Several pairs of circular bosses such as 123 are provided along the fin 121 with the fin separating the bosses of each pair.

The garment is manufactured on this form according to the processes outlined above and as a result of these operations liquid latex will accumulate as indicated at 124 in the junction between the fin 121 and the face of the form. However, the portion of the layer deposited on the face of the fin 121 can be stripped away as far as the abrupt edges 122 thereof leaving the edge of the flap and the adjacent edge of the bottom portion of the garment reinforced as indicated at 124, which reinforcements however, terminate in torn or feather edges 125. Similarly, the portions of the rubber layer deposited on the face of the bosses 123 can be stripped away leaving circular openings reinforced as indicated at 126.

The garment shown in Figs. 16, 17, and 18 can best be made on the form 130 shown in Figs. 44, 45, and 46. This form differs from that last described in that the fin 131 instead of being rectangular in cross section, has a curved or sloping surface 132 as indicated in Fig. 46, and terminates in a relatively sharp edge 133, this edge being defined by the intersection of the curved surface 132 with a surface 134 projecting abruptly from the face of the form.

When a form of this character is dipped a plurality of times with a drying interval intervening, into a bath of liquid latex, the latex will tend to accumulate on the curved surface 132 of the fin, to define a reinforcement 135 in the layer. However, at the sharp edge 133 of the fin, the deposited layer will be relatively thin so that it can be separated along this line of weakness. However, in the junction between the surface 134 and the body of the form, a reinforcement of the character of that shown at 136 of Fig. 46 will be formed.

The various forms herein disclosed are made of the usual materials employed for this purpose, such as aluminum or glass.

It will be understood by skilled artisans that the latex can be vulcanized in any suitable way, either before or after depositing the same on a form to produce a garment.

While the garments have been described as being made of latex by deposition from an aqueous dispersion of rubber, any other materials having like characteristics may be employed.

While several embodiments of the invention have been disclosed, it will be understood that this invention is capable of still further modifications and that this disclosure is intended to cover any variations, uses or adaptations of the invention falling within the scope of the appended claims.

What I claim is:

1. In a form for making hollow seamless latex pants, a body portion provided with bosses projecting abruptly therefrom, each boss defining a leg opening in the resulting pants, said body portion on a part thereof opposite said bosses being provided with an abrupt edge to define a main opening in said pants, and a fin on the surface of said form provided with an abrupt edge and connecting said bosses.

2. In a form for making hollow seamless latex pants, a body portion provided with bosses projecting therefrom, each boss terminating in an abrupt edge to define a leg opening in the resulting pants, said body portion on a part thereof opposite said bosses being provided with an abrupt edge to define a main opening in said pants, and a fin on the surface of said form provided with an abrupt edge and connecting said bosses, the abrupt edge of said fin being defined by the intersection of a surface of the form with a surface projecting abruptly from the body of the form.

3. In a form for making hollow seamless latex pants, a body portion provided with bosses projecting therefrom, each boss terminating in an abrupt edge to define a leg opening in the resulting pants, said body portion on a part thereof opposite said bosses being provided with an abrupt edge to define a main opening in said pants, a fin extending from each boss on the surface of the form and provided with an abrupt edge.

4. A form for making hollow, seamless, latex pants, comprising a body portion provided with bosses projecting therefrom, each boss terminating in an abrupt edge to define a leg opening in the resulting pants, said body portion on a part thereof opposite said bosses being provided with an abrupt edge to define a main opening in said pants.

5. A form for making hollow seamless pants, said form comprising a flattened body portion having a general outline corresponding to the outline of the desired pants, a pair of spaced bosses of elongated outline on said body portion, each boss extending along an edge of the body portion to define a leg opening in the resulting pants, said body portion on a part thereof opposite said bosses and spaced therefrom being provided with an abrupt edge to define a main opening in said pants.

6. A form for making hollow seamless pants, said form comprising a flattened body portion having a general outline corresponding to the outline of the desired pants, said body portion having a concave surface at one face thereof, a pair of spaced bosses of elongated outline on said body portion, each boss extending along an edge of the body portion and projecting therefrom to an abrupt edge to define a leg opening in the resulting pants, said body portion on a part thereof opposite said bosses being provided with an abrupt edge to define a main opening in said pants.

7. A form for making hollow seamless pants, said form comprising a flattened body portion having a general outline corresponding to the outline of the desired pants, said body portion having a concave surface at one face thereof, a pair of spaced bosses of elongated outline on said body portion, each boss extending along an edge of the body portion and projecting therefrom to an abrupt edge to define a leg opening in the resulting pants, the concave surface and the opposing surface of said body portion on the part thereof opposite said bosses being provided with an abrupt edge to define a main opening in said pants, the abrupt edge at said concave surface extending beyond the abrupt edge of said other surface.

8. A form for making hollow seamless pants, said form comprising a flattened body portion having a general outline corresponding to the outline of the desired pants, said body portion having a concave surface at one face thereof, a pair of spaced plate-like bosses of elongated outline on said body portion, each boss extending along an edge of the body portion in offset relation to the main medial plane of said portion and projecting therefrom to an abrupt edge to define a leg opening in the resulting pants, the concave surface and the opposing surface of said body portion on the part thereof opposite said bosses being provided with an abrupt edge to define a main opening in said pants, the abrupt edge at said concave surface extending beyond the abrupt edge of said other surface.

9. A relatively thin, flattened dipping form for making hollow seamless rubber latex pants, said form including a body portion having adjacent one end thereof a part formed to define the waist opening of the resulting pants, and spaced members projecting from the edge of the body portion and of elongated cross sections at their junctions with said body portion to define leg openings in the body of the resulting pants, the edge of said portion between said members being transversely and longitudinally curved.

10. A form for making hollow seamless pants, said form comprising a relatively thin flattened body portion having an outline generally corresponding to the outline of the desired pants, a pair of spaced members of elongated cross-section joined to the edge of said body portion, to define leg receiving openings in the body of the resulting pants, said body portion on a part thereof opposite said members and spaced therefrom defining a waist receiving opening in the resulting pants, the flattened surfaces of said body portion smoothly merging into each other between said members to provide a transversely curved edge.

11. A form for making hollow seamless rubber pants, said form being flattened and having an outline generally corresponding to the outline of the desired pants, said form having a pair of spaced grooves therein each groove outlining a substantially oblong shape and located substantially at the edge of the form to define leg-receiving openings in the resulting pants, said form on a portion thereof opposite said grooves being provided with a part defining a waist-receiving opening in the resulting pants, the flattened surfaces of said form smoothly merging into each other between said grooves to provide a transversely curved edge of the form.

12. A form for making hollow seamless rubber pants, said form comprising a relatively thin flattened body portion having an outline generally corresponding to the outline of the desired pants, a pair of spaced members of elongated cross section on substantially the edge of said body portion to define leg receiving openings in the resulting pants, the flattened surfaces of said body portion smoothly merging into each other between said members to provide a transversely curved edge, means on said body portion opposite said members and spaced therefrom to define a waist receiving opening in the resulting pants, said means comprising a substantially continuous abrupt edge having relatively offset portions connected by sloping portions whereby said waist receiving opening is defined by offset margins of the pants.

ABRAHAM N. SPANEL.